United States Patent [19]

Ibrahim et al.

[11] Patent Number: 4,621,502

[45] Date of Patent: Nov. 11, 1986

[54] ELECTRONIC TEMPERATURE CONTROL FOR REFRIGERATION SYSTEM

[75] Inventors: Fayez F. Ibrahim; Kwok K. Fung, both of Niles, Mich.

[73] Assignee: Tyler Refrigeration Corporation, Niles, Mich.

[21] Appl. No.: 690,606

[22] Filed: Jan. 11, 1985

[51] Int. Cl.⁴ .................. F25B 41/04; F25B 49/00; G01K 13/00

[52] U.S. Cl. ........................... 62/223; 62/225; 62/228.3; 62/130

[58] Field of Search ............... 62/224, 225, 211, 208, 62/210, 126, 129, 130, 228.3, 228.1, 226, 223, 157, 231, 203, 204; 236/78 D; 165/12; 340/588, 585

[56] References Cited

U.S. PATENT DOCUMENTS

| | | | |
|---|---|---|---|
| 4,112,703 | 9/1978 | Kountz | 62/225 X |
| 4,283,921 | 8/1981 | Prosky | 62/130 X |
| 4,307,576 | 12/1981 | Takano et al. | 62/231 X |
| 4,459,819 | 7/1984 | Hargraves | 62/225 X |
| 4,478,051 | 10/1984 | Ibrahim | 62/211 X |
| 4,495,779 | 1/1985 | Tanaka et al. | 62/223 X |
| 4,505,125 | 3/1985 | Baglione | 62/228.3 X |
| 4,506,518 | 3/1985 | Yoshikawa et al. | 62/204 X |
| 4,523,435 | 6/1985 | Lord | 62/225 X |
| 4,527,399 | 7/1985 | Lord | 62/225 X |

Primary Examiner—Harry Tanner

[57] ABSTRACT

A refrigeration system for a display case including electronic means for controlling an expansion valve and a refrigerant compressor used in the system. The expansion valve is cycled between open and close positions to modulate refrigerant flow into an evaporator coil. A microprocessor controls the operation of the expansion valve in response to: (a) the relationship of the temperature of air that has passed over the evaporator coil to multiple upper and lower limits (b) time integrated temperature deviations beyond preselected limits (c) upward or downward trend of the differential in temperature in the refrigerant during its flow through the evaporator coil, and (d) extreme deviation of the temperature of air that has passed over the evaporator coil. Compressor cut-in and cut-out pressures are also adjusted by the control in response to these air and refrigerant temperatures. In addition, the various limits may be adjusted according to a night setback schedule, and an alarm is provided to warn of relatively long-term deviation of the controlled temperature.

60 Claims, 7 Drawing Figures

ELECTRONIC TEMPERATURE CONTROL FOR REFRIGERATION SYSTEM

BACKGROUND OF THE INVENTION

The present invention involves a refrigeration control system for controlling the operation of refrigeration equipment to insure efficient operation thereof under a sophisticated control of critical temperature and pressure parameters.

In recent years numerous technological advances have been made for optimizing the energy use of a refrigeration system through the use of electronic controls. One such system is disclosed in assignee's U.S. Pat. No. 4,478,051 to Ibrahim. In that patent an electronically controlled expansion valve is actuated under the control of a series of temperature and pressure determinations to secure efficient operation and particularly to maintain the temperature of the refrigerant discharged from the evaporator coil above the saturation temperature. The present invention constitutes an improved control system which incorporates multiple temperature and pressure control concepts capable of providing highly effective and energy efficient control of refrigerated display cases and systems.

Other electronic control systems for refrigeration systems are disclosed in U.S. Pat. Nos. 3,872,685 to Matthis, 4,102,150 and 4,112,703 to Kountz, 4,129,995 to Usami and 2,614,393 to Schulz et al.

The Matthis patent disclosed an electronically controlled expansion valve wherein the temperature at the outlet of the refrigeration air conduit is measured and compared with a preselected temperature for controlling the operation of the expansion valve.

The two patents to Kountz disclose systems for controlling air conditioning refrigeration systems used in automobiles. In the first of these patents the temperature along the discharge line from the evaporator coil is measured and the temperature within the space being air conditioned is measured and each of these temperatures is compared to a set temperature and in response to such comparison output signals are provided for controlling the operation of a solenoid operated control valve located in a by-pass line around the compressor for controlling the crankcase pressure within the compressor. In the second of the two patents to Kountz the temperature along the discharge line of the evaporator as well as the temperature within the space being air conditioned are both measured. An electromechanically controlled valve is included in series with the refrigeration circuit between the condensor and the evaporator and serves to control the flow of refrigerant through the evaporator.

The patent to Usami discloses a refrigeration control system for controlling an expansion valve in response to the temperature and pressure of the refrigerant discharged out of the evaporator. The patent to Schulz et al discloses a refrigeration system with a control mechanism designed to respond to variations in load conditions within the refrigeration system and to provide control signals for compensating for overlaod conditions arising during such operation. An electrically controlled valve controls the flow of refrigerant to the expansion valve.

SUMMARY OF THE INVENTION

An object of the present invention is to provide a refrigeration system with an improved control arrangement for more efficiently operating the refrigeration system.

Another object of the present invention is to provide a refrigeration control system for efficiently operating the refrigeration system and maintaining the temperature level of the air discharge from the primary or refrigeration air duct or conduit of the controlled refrigeration unit in such system.

A further object of the present invention is to provide a refrigeration control system that attains an effective degree of maintenance of the increase in the temperature of the refrigerant during its passage through the evaporator coil within predetermined limits wherein such control system provides for monitoring of the trend of the upward or downward temperature differential and is responsive to a determination as to whether or not the trend is upward or downward.

A further object of the invention is to provide a refrigeration control system for maintaining an effective degree of control of the temperature of the air discharge from the primary or refrigeration air duct or conduit of the controlled refrigeration unit while also providing for avoidance of evaporator coil flood out.

A still further object of the invention is to provide an improved refrigeration control system that provides for maintenance of the temperature level of the air discharged from the primary or refrigeration air duct or conduit of the refrigeration case as a predetermined function of whether the variation occurs within multiple predetermined sets of limits and provides for time integrated adjustment of the cooling function in addition to proportional adjustment of the cooling function within the outermost limits in still further addition to maximum upward or downward adjustment of the cooling function beyond the outermost limits.

A further object of the invention is to provide an improved refrigeration control system as just described which further includes a monitoring of the rise or fall of the temperature differential of the refrigerant entering the evaporator coil compared to its temperature leaving the coil and a monitoring of the upward or downward trend in addition to the differential value and an adjustment of the flow of refrigerant through the expansion valve as a function of both the value of the differential and the time integrated direction of the trend.

A further object of the invention is to provide an improved refrigeration control system that provides for maintenance of the temperature level of the air discharged from the primary or refrigeration air duct or conduit of the refrigeration case which includes a temperature sensing means for sensing the temperature of air that has passed over the evaporator coil, means for storing time related temperature parameters, means for setting preselected temperature control parameters including temperature differential limits and time related temperature parameters, means for comparing the temperature of the air that has passed over the evaporator coil with said limits, electronic signals indicative of the flow rate of the valve, means for comparing the stored time related temperature parameters with the set limits and time related temperature parameters, and means for controlling the flow rate of refrigerant through the valve as a function of the differentials between the temperature of the air that has passed over the refrigerator coil and said limits and the comparison of the stored time related temperature parameters and set time related temperature parameters and the flow rate of the valve as indicated by the said electronic signal.

A further object of the invention is to provide a refrigeration control system that includes a long-term alarm device for sensing and reporting relatively long-term continuously existing deviations in controlled temperature.

It is another object of the invention to provide an improved refrigeration control system that provides for electronic control of the rate of flow through the expansion valve and provides for control of the cut-in and cut-out suction pressures of the compressor means as a function of the rate of flow of the refrigerant through the expansion valve.

These objectives are achieved by the new control arrangement utilized within a refrigeration system in accordance with the present invention. The refrigeration system in which such control arrangement is preferably utilized includes at least one refrigerated display case having an evaporator coil within a primary or refrigeration air duct or conduit and an expansion valve coupled to the inlet of the evaporator coil for supplying a refrigerant thereto. The discharge line from the evaporator is then coupled back to a compressor within the refrigeration system.

The control system includes a first temperature sensing device which is arranged to sense the temperature of the air in the primary or refrigeration duct or conduit of the refrigeration case after it has passed over the evaporator coil ($T_{case}$). A second temperature sensing device is arranged along the evaporator coil inlet line for sensing the temperature of the refrigerant flowing into the evaporator coil before it passes over the coil ($T_{evin}$). A third temperature sensing device is arranged along the discharge line of the evaporator coil for sensing the temperature of the refrigerant passing out of the coil ($T_{evout}$).

In accordance with the present invention it is desirable to maintain the difference between the temperature of the refrigerant leaving the evaporator coil and the temperature of the refrigerant entering the evaporator coil within predetermined limits and to effectuate such control in a manner which is a function of whether or not the difference temperature is increasing or decreasing and wherein the control acts at a more rapid rate in a situation where the temperature differential is increasing. The control system of the invention thus provides for a monitoring of the temperature differential ($T_{evout}$ minus $T_{evin}$) to determine its upward or downward trend and provides for an initiation of corrective action when the absolute value of the differential exceeds one or the other of at least two predetermined set values with the selection of the particular value being dependent upon the upward or downward trend of the differential or superheat temperature ($T_{evout}$ minus $T_{evin}$).

In accordance with the present invention it is also desirable to maintain the temperature of the air in the primary or refrigeration air duct within multiple expanding sets of limits wherein corrective action is provided as a function of the particular set of limits which is exceeded as well as a function of operation within certain minimal limits if the trend within such limits over a period of time is upward or downward.

According to a preferred embodiment the control system of the invention is provided with a memory or storage unit pre-programmed to store at least two sets of temperature limits for the refrigerant air, such as a set temperature $T_{set}$ plus or minus 1° F. and $T_{set}$ plus or minus 5° F. ($T_{sp1}$, $T_{sm1}$, $T_{sp5}$ and $T_{sm5}$). A comparator compares the air temperature sensed in the refrigeration duct of the case ($T_{case}$) with the limits $T_{set}$ plus or minus 1 ($T_{sp1}$ and $T_{sm1}$) and plus or minus 5 ($T_{sp5}$ and $T_{sm5}$) as described. If the comparator determines that the temperature $T_{case}$ exceeds the outer limits $T_{sp5}$ or $T_{sm5}$ a control signal is provided to the expansion valve to adjust the flow therethrough to its maximum or minimum value as the case may be.

According to the preferred embodiment of the invention the expansion valve is of a type which is solenoid controlled between a fully open or fully closed condition and is capable of oscillating or moving between such conditions at a rapid rate in response to control signals. The expansion valve may be preset to a nominal on/off duty cycle of 50/50 or on time equal to off time per cycle. Thus in an illustrative operating cycle of 4 seconds the nominal set on/off time of the expansion valve would be 2 seconds on and 2 seconds off. According to the invention the flow through the valve is controlled by increasing or decreasing the on/off time ratio during each 4 second cycle.

If the comparator determines that the case air temperature exceeds the set temperature by less than 5° an input signal is provided to a proportional controller to provide proportional adjustment of the on/off time of the expansion valve to effect corrective action. Similarly if the comparator determines that the case air temperature is lower but less than $-5°$ lower than the set temperature, an input signal is provided to the proportional controller to provide a proportional adjustment in the on/off time of the expansion valve to effect corrective action.

A further feature of the invention is the provision of a pair of counter-accumulators or registers which accumulate or totalize the number of times that the air temperature exceeds the plus or minus 1° set limit during a predetermined period of time such as 5 minutes. A comparator is provided in association with such counter-accumulators to scan such devices to determine whether or not the total number of excursions beyond the 1° limits during the predetermined time period exceeds an empirically set value preprogrammed into the comparator. If such predetermined total is exceeded corrective action is instituted to appropriately adjust the on/off time of the expansion valve to attempt to take preventive action to avoid a more extreme excursion of the monitored air temperature.

According to the invention a night set-back device is provided to accomplish an automatic adjustment or set-back of the set case temperature $T_{set}$ during nighttime hours and other hours when the store is closed. This automatically adjusts the various limits which are functions of $T_{set}$. During the nighttime hours when the stores in which the display cases are located are closed it is often possible to run the display cases at a slightly higher temperature since the ambient air in the area outside of the display cases is normally lower during such nighttime hours due to both natural weather conditions and the absence of people and activities within the store. The set-back feature reduces the overall energy requirements of the system and results in significant energy savings.

According to another feature of the invention the suction pressure of the compressor is monitored and circuitry is provided to detect continuous operation at either high or low expansion valve flow rates. When such conditions have existed beyond preselected limits adjustments in compressor cut-out and cut-in control pressures are made to minimize compressor running time and maximize energy savings.

A central computer can be connected to individual temperature and pressure controllers for each of the display cases within a system or series of display cases within the system so that the central computer can communicate with the individual controllers and set the desired temperatures and temperature differentials and pressures and pressure differentials for each of the display cases.

DESCRIPTION OF THE PREFERRED EMBODIMENTS

Figure 1:
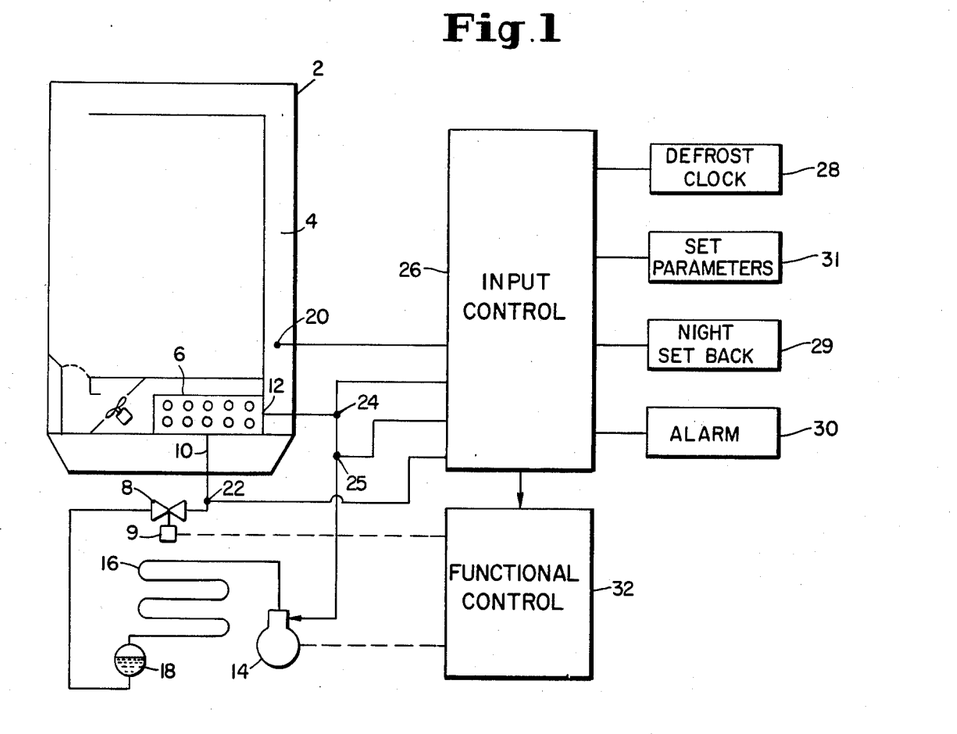
FIG. 1 is a representational block diagram illustrating a refrigeration system in accordance with the present invention.

A refrigeration system in accordance with the present invention such as is shown by the representational diagram in FIG. 1 includes a display case 2 having a primary or refrigeration air duct or conduit 4 in which an evaporator coil 6 is arranged. The evaporator coil is provided with a refrigerant that passes through an electronically controlled expansion valve 8 into the evaporator through an input line 10. The expansion valve is actuated by a solenoid control 9. As the refrigerant passes through the evaporator coil 6 it extracts heat from the air circulated over the evaporator coil and through the primary or refrigeration air conduit 4. By the time the refrigerant leaves evaporator coil 6 through discharge or suction line 12 the refrigerant has been completely converted to a gaseous state. This gaseous refrigerant then is returned to a compressor 14 where the gas is compressed and subsequently fed to a condenser 16. The gaseous refrigerant is transformed back into a liquid state in the condenser and is supplied to a receiver 18. The liquid refrigerant is then drawn out of the receiver 18 and supplied to the expansion valve 8 for again being circulated through the evaporator coil 6.

Arranged within the primary or refrigeration air duct or conduit 4 is a first temperature sensor 20 for sensing the temperature of the air that has passed through the case over evaporator coil 6 ($T_{case}$). A second temperature sensor 22 is arranged along the evaporator coil inlet line 10 for sensing the temperature of the refrigerant flowing into the evaporator coil 6 ($T_{evin}$). A third temperature sensor 24 is arranged along the compressor suction line 12 for sensing the temperature of the refrigerant passing out of the evaporator coil 6 ($T_{evout}$). A pressure sensor 25 is connected to the suction line 12 for sensing the suction pressure of the compressor ($P_s$).

The temperatures from sensors 20, 22 and 24, namely $T_{case}$, $T_{evin}$ and $T_{evout}$, and the pressure $P_s$ from sensor 25 are all supplied to an input control device 26. Input control device 26 carries out a series of calculations based upon the various temperature and pressure measurements and additional information inputted by the equipment user. This input control device can be a microcomputer system supplied with information regarding the temperature within the store, the time of day and various parameters set by the user as shall be described. Such control signals can be supplied from a defrost clock 28 for providing control signals whenever a defrost operation is to take place, a night setback clock 29 for providing control signals whenever the store is closed and any one or more set parameters is to be varied, and a parameter set module 31 for inputting user established limits and set points. An output signal from control device 26 is connected to an alarm device 30 for providing an alarm signal when the temperature of the air passing through the primary or refrigeration air conduit exceeds a preselected alarm value or number for a preselected accumulated time temperature integrated value.

Information from control device 26 is fed to and processed by a functional control means 32 for providing valve control signals which are supplied to the solenoid controller 9 for electronically controlled expansion valve 8 as well as compressor control signals for controlling the cut-in and cut-out pressures of the compressor 14. The operations of input control device 26 and functional control means 32 can be carried out within a microcomputer. In a specific example of the invention such operations are performed in a Motorola microprocessor MC68705P3 which may operate at a clock frequency of 1 MHz. In a specific example the microprocessor 26-32 is programmed to operate on a nominal 4 second cycle (actual 4.18 second). Thus at the beginning of each cycle the temperatures $T_{case}$, $T_{evin}$ and $T_{evout}$ and the compressor suction pressure $P_s$ are read by and inputted into the microprocessor. The expansion valve 8 and controller 9 are preferably of the completely open or completely closed type capable of moving from open to closed and vice versa at a high speed. Such a valve is commercially available from Alco division of Emerson.

Figure 2:
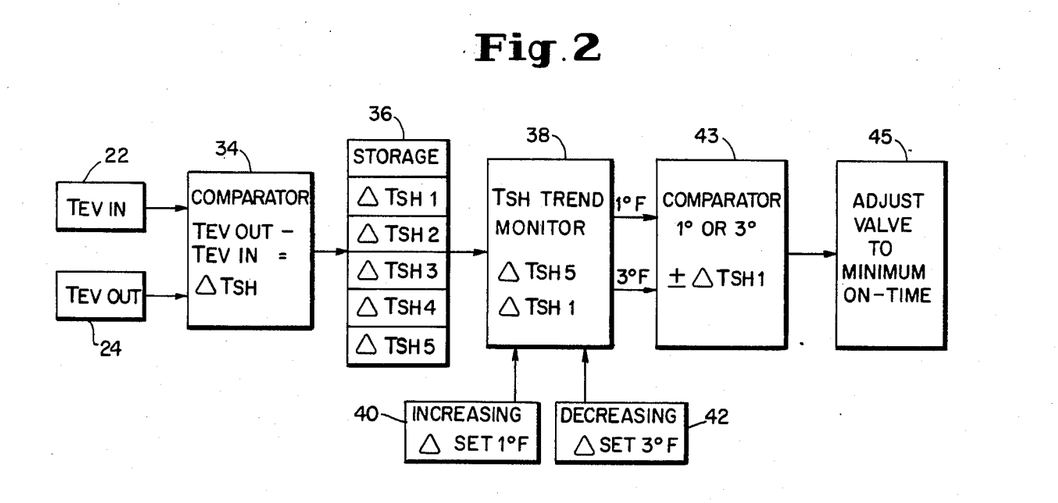
FIG. 2 is a representational block diagram of a first portion of the refrigeration control system of the present invention.

Referring to FIG. 2 there is shown a representational block diagram of the trend sensing and controlling portion of the circuit of the microcomputer 26-32. During each 4 second cycle a comparator 34 compares the output and input temperatures $T_{evout}$ and $T_{evin}$ of the evaporator 6 sensed by temperature sensors 22 and 24 to determine the difference or superheat temperature DELTA $T_{sh}$. These temperature differences are fed to a memory or storage unit 36 in the microcomputer circuitry wherein 5 temperature difference DELTA $T_{sh}$ readings are stored. (DELTA $T_{sh1}$ through DELTA $T_{sh5}$). The contents of the memory 36 are scanned or inspected once per cycle by the comparator or $T_{sh}$ trend monitor 38 which compares the oldest temperature difference reading DELTA $T_{sh5}$ with the most recent temperature difference reading DELTA $T_{sh1}$ to provide an indication of any upward or downward trend in superheat temperature. The trend monitor 38 is provided with temperaure trigger increment set devices 40 and 42. These set inputs may be adjusted by the user to predetermine the superheat trigger increments which control the region wherein superheat criteria exercises a control action. In the illustrative embodiment the set device 40 provides a 1° F. increment and the set device 42 provides a 3° F. increment. The set mechanism 40 is effective when the superheat temperature $T_{sh}$ is increasing and set mechanism 42 is effective when superheat temperature $T_{sh}$ is decreasing. Obviously values other than 1° F. and 3° F. may be set as desired.

If the trend monitor 38 determines that the most recent superheat temperature difference reading DELTA $T_{sh1}$ is higher than the oldest reading DELTA $T_{sh5}$ reading in the memory 36 there is an indication that the superheat temperature is increasing or trending upward. In such an instance the trend monitor 38 forwards the preset upward trigger value or increment of 1° F. to the comparator 43 which compares that increment with the latest DELTA $T_{sh1}$ reading stored in the memory 36. If the comparison indicates that the difference is less than 1 an action initiation signal is forwarded from comparator 43 to the valve signal generator control device 45 which is programmed to adjust the valve on time to its minimum value of 0.12 seconds per 4 second cycle.

If the trend monitor 38 determined that the most recent superheat temperature difference reading DELTA $T_{sh1}$ was less than the oldest reading DELTA $T_{sh5}$ in the storage or memory device 36 this would indicate that the superheat $T_{sh}$ is trending downward and the trend monitor 38 would input the preset trigger value 3° F. to the comparator 43. If the most recent temperature difference reading DELTA $T_{sh1}$ is less than 3° F. then an actuating signal is forwarded to the signal generator control device 45 to adjust the expansion valve on time to its minimum on time limit or 0.12 seconds per cycle. Thus it will be seen that if superheat is low and trending upward the evaporator coil is headed away from flood out; the preset trigger value of 1° F. is utilized, above which valve function is not restricted by superheat criteria. On the other hand if superheat is high and trending downward the evaporator coil is headed towards flood out, the preset value of 3° F. is utilized, below which the valve is set at minimum on time to avoid coil flood out. Corrective action is effectuated by changing the off time (valve closed time) per cycle of the expansion valve 8. While off time is generally referred to it will be recognized that on time could as readily be utilized as the reference parameter since on time equals 4 seconds minus off time seconds.

Figure 3:
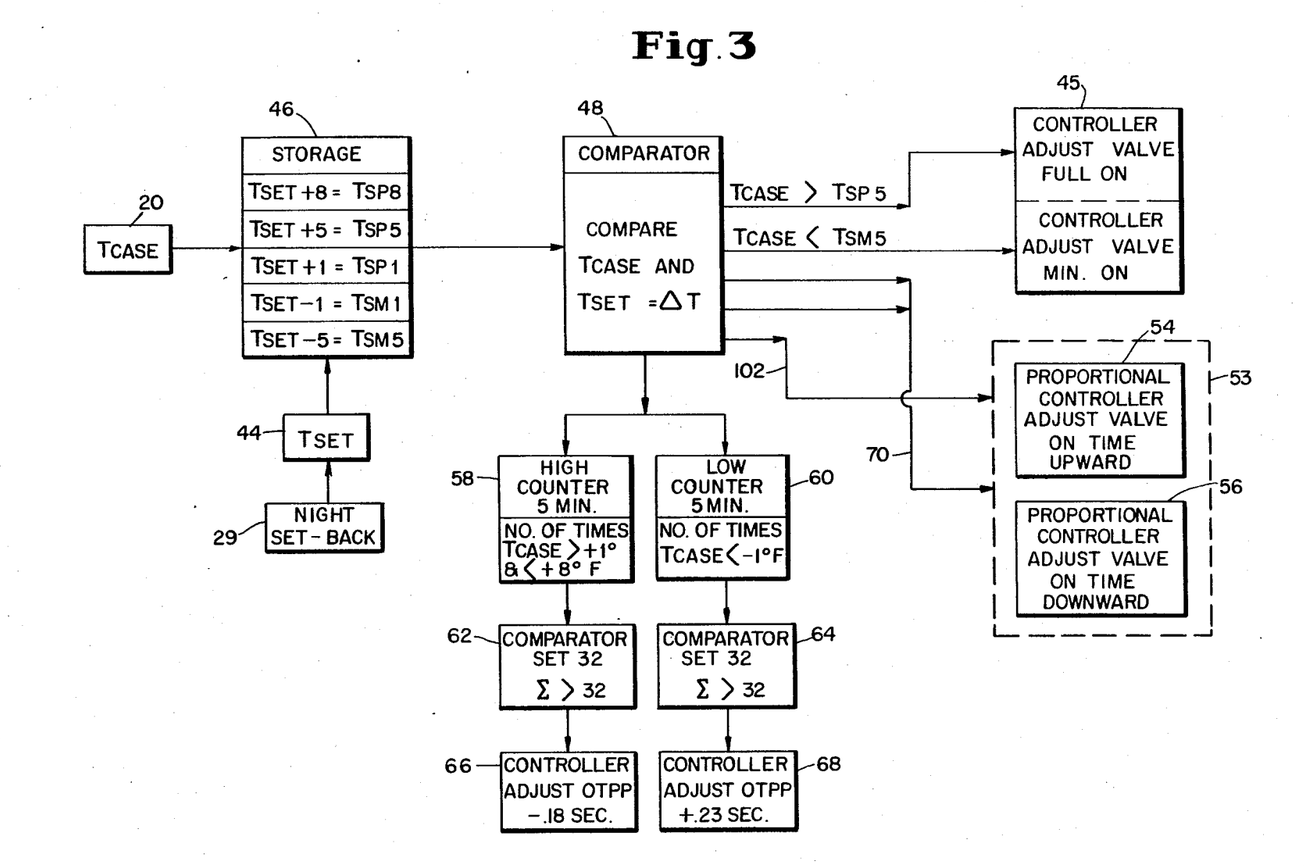
FIG. 3 is a representational block diagram of a second portion of the refrigeration control system of the present invention.

Referring to FIG. 3 there is shown a diagramatic illustration of that portion of the microcomputer circuitry that effects a control of the expansion valve off time in response to the temperature of the air flowing through the primary or refrigeration conduit of the case which is sensed by temperature sensor 20. By means of a case temperature set mechanism 44 the equipment user can set the desired case temperature ($T_{set}$) in the primary or refrigeration duct or conduit as, for example, 28° F. The night set back set mechanism 29 provides for an automatic set back of $T_{set}$ during nighttime hours and other hours when the store is closed. This unit may be provided with a self-contained clock or may receive a time signal from a central controller or computer position. It has been found that during the hours that the store is closed it is possible to run the display cases at a slightly higher temperature such as 2°–4° F. which will result in energy savings of about ten percent. During such time that the night set back mechanism is actuated as determined by the clock control the temperature $T_{set}$ is adjusted upwards by the preselected amount.

A memory or storage unit 46 in the microcomputer circuitry is programmed to store five pre-set limit temperatures based on the set case temperature $T_{set}$, such as for example, the set temperature $T_{set}$ plus 8° F., plus 5° F., plus 1° F., minus 1° F. and minus 5° F. as follows:

$$T_{set}+8=T_{sp8}$$

$$T_{set}+5=T_{sp5}$$

$$T_{set}+1=T_{sp1}$$

$$T_{set}-1=T_{sm1}$$

$$T_{set}-5=T_{sm5}$$

A comparator 48 compares the sensed case air temperature $T_{case}$ with the aforesaid values of $T_{set}$ as stored in the memory 46 as just described. This comparison produces an output signal which is determined by the sensed value of $T_{case}$. Thus if the comparison of $T_{case}$ and the temperature values stored in memory 46 in comparator 48 indicates that $T_{case}$ exceeds $T_{sp5}$, an output is provided from comparator 48 to the valve signal generator control device 45 which adjusts the valve control signal to turn the expansion valve 8 continuously on or continuously open during the cycle (off time equals zero).

If the comparator 48 determines that $T_{case}$ is less than $T_{sm5}$ an input is provided to the valve signal generator control device 45 to power the valve to its minimum on or open condition which by way of example may be empirically set to 0.12 seconds per 4 second cycle. Generally speaking it has been found desirable to avoid completely closing the valve during the refrigeration cycle (off time equals 4 seconds; on time equals zero) because this tends to cause extreme swings in temperature with concomitant hunting. However the control device described herein is capable of placing the expansion valve in the completely closed position under control of the proportional controller in extreme temperature deviation situations. It has been found that such situations occur infrequently when using the control system of the invention.

If the comparator 48 determines that $T_{case}$ exceeds $T_{set}$ by less than +5° F. an input signal is provided to a proportional controller 53 having a high temperature controller section 54 to provide proportional control to increase the expansion valve on time in a manner presently to be described. If the comparator 48 determines that $T_{case}$ is lower than $T_{set}$ by less than −5° a signal is provided to the proportional controller 53 to the low temperature controller section 56 to decrease the expansion valve on time as will be presently described.

Simultaneously with the foregoing the comparator 48 also provides two 5 minute counter-accumulators, registers or totalizers 58 and 60 with a pulse or count signal for each four second cycle during which the sensed $T_{case}$ temperature was in excess of +1° but less than +8° higher than $T_{set}$ (in counter-accumulator or register 58) or lower than −1° below $T_{set}$ (in counter-accumulator or register 60). Counter-accumulator 58 may be referred to as the high accumulator and counter-accumulator 60 as the low accumulator. Counter-accumulators 58 and 60 are programmed to accumulate or total the count of the foregoing high and low pulses or occurrences or excursions over a time period of 5 minutes. Associated with the high counter-accumulator 58 is a comparator 62 which is programmed to scan the high counter-accumulator 58 once per minute to determine whether or not the total number of pulses inputted or incremented into that counter-accumulator exceeds an empirical value set or programmed into the comparator. By way of example for a particular refrigerated display case a value of 32 was found to be satisfactory.

If the accumulated value or total in the high counter-accumulator 58 exceeds 32 the comparator 62 provides a signal to a valve signal generator control device 66 to reduce the valve off time or closed time per pulse or cycle. This signal reduces the off time per cycle by an empirically set 0.18 seconds per cycle to thereby increase the flow of refrigerant which tends to reduce the temperature $T_{case}$. The value of 32 is illustrative only. If the value is too small, action (off time adjustment) will occur too quickly and frequently. If the value number is too large, off time adjustment will occur too slowly and infrequently. If the accumulated count or total in the register or counter-accumulator 58 exceeds 32 it signifies that the monitored temperature $T_{case}$ was above the nominal value of $+1°$ F. and less than $+8°$ F. or high more than 32 times in the preceding 5 minutes. Comparator 64 compares the figure in low counter-accumulator or register 60 with the set number 32, to perform a similar function for the low temperature condition. Thus if the set number 32 was exceeded the valve signal generator control device 60 provides an increase in the valve actuating signal off time per pulse of an empirically set 0.23 seconds to create a tendency to raise the case temperature.

The function of the counter-accumulators 58–60, comparators 62–64 and valve signal control devices 66–68 is to provide for an adjustment in the valve actuating signal off time per cycle even though the sensed case temperature $T_{case}$ may be within plus or minus 1° of the set case temperature $T_{set}$ at the time of the latest one minute cycle of sensing of the counter-accumulators. The counter-accumulators 58 and 60 store a 5 minute accumulation of data and are interrogated once per minute. If the count in the counter-accumulator exceeds the set number of 32 and action is taken via comparators 62–64 and valve actuating signal control devices 66–68, the contents of the counter-accumulator are discarded and a new accumulation of pulses or counts is commenced to continue for the next 5 minutes. On the other hand, if at the time of the 1 minute sensing by the comparators 62–64, the accumulation in the counter-accumulators 58–60 is less than the set figure of 32 whereby no action is indicated or taken, the counter-accumulators are not cleared of their entire 5 minutes accumulation but only of the oldest 1 minute accumulation or count. It will thus be seen that the counter-accumulators and associated circuitry provide a fine degree of integrated control of the operation of the case within the permissible temperature variation limits of plus or minus 1° F. of set case temperature.

Figure 4:
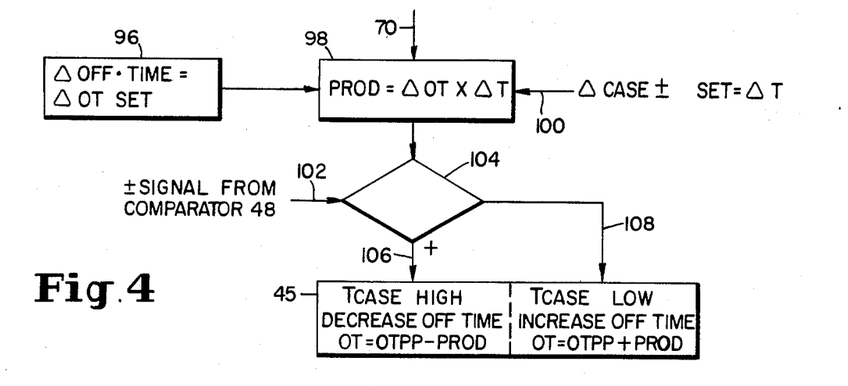
FIG. 4 is a representational block diagram for the operation of the proportional controller in FIG. 3.

Referring to FIG. 4 there is shown a diagram of the control circuitry in the proportional controller 53. The proportional controller 53 may change the valve on/off time control signal under either of two conditions. If the comparator 48 determines that $T_{case}$ exceeds $T_{set}$ but by less than $+5°$ F. the valve control signal is modified by proportional controller 53 to increase the valve on time. If the comparator 48 determines that $T_{case}$ is lower than $T_{set}$ but less than $-5°$ F. lower than $T_{set}$ the valve control signal is modified by proportional controller 53 to decrease the expansion valve on time. Referring to FIG. 4 the proportional controller 53 logic receives a sample of the expansion valve control signal on input line 70 under either of the foregoing two circumstances. This signal is an indication of the flow rate setting of the expansion valve, i.e. the existing or current off time per pulse (OTPP).

The proportional controller provides for an adjustment in valve off time per pulse which is to be effected per degree F. temperature difference between $T_{case}$ and $T_{set}$, i.e. adjustment proportional to the amount of the difference between $T_{case}$ and $T_{set}$. This incremental adjustment in off time per pulse is empirical and may vary with the type of refrigerated display case being controlled. In a typical illustrative example it was determined that a value of 0.17 second/°F. is satisfactory. This off time per pulse adjustment increment is referred to as DELTA Off Time and generally may be approximately 0.125–0.18 second/°F.

The DELTA Off Time value (0.17 second/°F.) is fed from DELTA Off Time set device 96 to microprocessor circuitry 98 which also receives the absolute value of the difference between $T_{case}$ and $T_{set}$ (DELTA T) from comparator 48 on line 100. The circuitry 98 performs a multiplication of the DELTA Off Time increment from set device 96 times the absolute temperature difference (DELTA T) to provide a product value (PROD). The comparator 48 determines not only the absolute difference between $T_{case}$ and $T_{set}$ but also an indication of whether DELTA T is positive or negative. This positive or negative sign signal is fed via line 102 from comparator 48 to a controller 104. Depending on the positive or negative signal or indication received on line 102 the controller or switch 104 directs the product signal (PROD) from circuit 98 either via high line 106 to valve signal control device 45 if $T_{case}$ is above $T_{set}$ and the value of the sign signal is positive or via a low line 108 if $T_{case}$ is below $T_{set}$ and the sign signal is negative.

When the controller 45 receives a signal on high line 106 it sets the off time equal to the existing or current off time per pulse or cycle inputted to the controller 53 minus the product outputted by the controller via the logic circuitry in FIG. (OTPP−PROD). This decreases the valve off time to increase the cooling to tend to lower the case temperature $T_{case}$. Conversely when the controller 45 receives a signal on low line 108 it generates a valve control output signal wherein the off time is equal to the said existing off time per pulse plus the said product (OTPP+PROD). This increases the valve off time to decrease the cooling and tend to raise the case temperature $T_{case}$. Thus this feature of operation of the control system of the invention provides proportional control of the expansion valve off time as a function of the existing off time value as fed into the controller 53.

Figure 5:
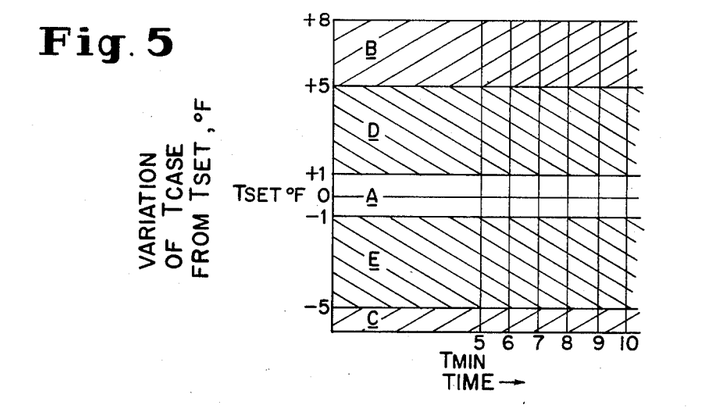
FIG. 5 is a graphic illustration of the various zones of control of the refrigeration control system of the present invention.

Referring to FIG. 5 there is seen a graphic representation of the types of temperature control exercised according to the invention as thus far described. The variation of $T_{case}$ from $T_{set}$ in degrees F. is plotted against time. For ease of illustration $T_{set}$ is shown as zero. In the region A where $T_{case}$ is between $T_{set}+1$ and $T_{set}-1$ at the time that the temperature is sensed each cycle no input to the counter-accumulators occurs. However, the counter-accumulator circuitry 58–60 and associated comparators 62–64 and controllers 66–68 continuously accumulate a count of the number of times during a 5 minute period that the $T_{case}$ value exceeded $T_{set}+1$ and was below $T_{set}+8$ or was lower than $T_{set}-1$. If at the end of the initial 5 minutes the count in either comparator 62 or 64 exceeds the empirically set limit of 32 the on time per pulse is adjusted downwardly by 0.18 seconds or upwardly by 0.23 seconds as the case may be as described hereinbefore.

This sensing of the 5 minute total occurs once per minute and the foregoing action will occur even if $T_{case}$ is between $+1°$ F. and $-1°$ F. at the time of the sensing. If such an adjustment in off time occurs as a result of this totalization the accumulation in counter 58 or 60 which caused the adjustment is emptied or discarded and a new 5 minute accumulation commences. On the other hand, if the count in comparators 62 and 64 is less than 32 and no adjustment is made the oldest 1 minute of count is discarded and the comparators are sensed again at the end of the next minute or minute 6 in this illustration. Thus, while no input to the counter-accumulators occurs as a direct result of the fact that the difference between $T_{case}$ and $T_{set}$ does not exceed plus or minus 1°, an adjustment will be made if the totalized or integrated observation of the difference in temperatures has gone above the plus or minus 1° limit (undergone an excursion) more than the predetermined number of times within the preceding 5 minutes.

The initial nominal off time per 4 second pulse or cycle (and on time) of the control signal is 2 seconds at the commencement of operation of the equipment. The operation of the counter-accumulator circuitry 58-68 will cause variation in this off time per pulse as described.

Returning to FIG. 5, if the difference between $T_{case}$ and $T_{set}$ is greater than $+5°$ F. or $-5°$ F. in the regions indicated at B and C the control circuitry 50 and 52 adjusts the expansion valve control signal to full on in the positive region B or to minimum off in the negative region C.

If the value of the difference between $T_{case}$ and $T_{set}$ is between $+5°$ and $-5°$ the unit is operating in regions A, D or E in FIG. 5. In these regions the off time per cycle is proportionally adjusted by circuitry 53 to increase or decrease the off time per cycle as a proportional function of the absolute difference between $T_{case}$ and $T_{set}$ (DELTA T) as applied to the off time per cycle determined as a result of the operation of the counter-accumulator control circuitry 58-68, the very high or very low control circuitry 50-52 and/or the superheat control circuitry of FIG. 2. The result is a refined and sophisticated control of the desired case temperature while avoiding wide swings and particularly avoiding such swings in a "hunting" operation. The refrigerated product is thereby protected and the case operation is considerably more energy efficient than is generally achieved with more simplistic control systems which are generally found to be prone to excessive hunting.

An illustrative operation of the $T_{case}$ actuated portion of the control system of the invention in a refrigeration system is now described assuming a nominal OTPP (off time per pulse or cycle) =2 seconds and $T_{case}=T_{set}=28°$ F.:

At the commencement of operation there will be no change in the off time per cycle so long as $T_{case}$ remains at $T_{set}$. If $T_{case}$ differs from $T_{set}$ by less than 5° F. there will be a proportional adjustment of off time as described for the regions A, D and E in FIG. 5. This adjustment in off time may maintain $T_{case}$ in the regions A, D and E. Simultaneously with this control there is an accumulation or totalization in counter-accumulators 58 and 60 of the number of times within the preceding 5 minutes that $T_{case}$ underwent an excursion beyond the plus or minus 1° F. limits but less than +8° F. This totalization is sensed once per minute and at any time that it exceeds 32 there is an adjustment in off time by controllers 66 or 68 to decrease OTPP by 0.18 seconds or to increase OTPP by 0.23 seconds as the case may be. This changes the value of OTPP utilized in the proportional adjustment described in relation to FIG. 4. Thus the expansion valve is simultaneously actuated not only as a proportional function of the variation of $T_{case}$ from $T_{set}$ but also as a function of the time integrated upward or downward trend of $T_{case}$ during the preceding 5 minutes.

In addition to the foregoing there is a continuous monitoring of the rise in temperature of the refrigerant in its passage through the evaporator coil and this is also time integrated to establish action limits as described in relation to FIG. 2. If $T_{sh}$ is less than these respective action limits there has been a significant departure from the desired operating parameters and the valve on time is adjusted to its minimum value of 0.12 seconds (off time equals 3.88 seconds). Reference to the description of the operation of the proportional controller in relation to FIGS. 3 and 4 will indicate that this is beyond its normally encountered range of operation. In still further addition to the foregoing there is a control exercised if the case temperature $T_{case}$ exceeds the outer limits of plus or minus 5° F. from $T_{set}$. When this occurs the controller 45 in FIG. 3 adjusts the valve control off time to zero (continuously on) or to minimum on as the case may be as has been previously described.

Figure 6:
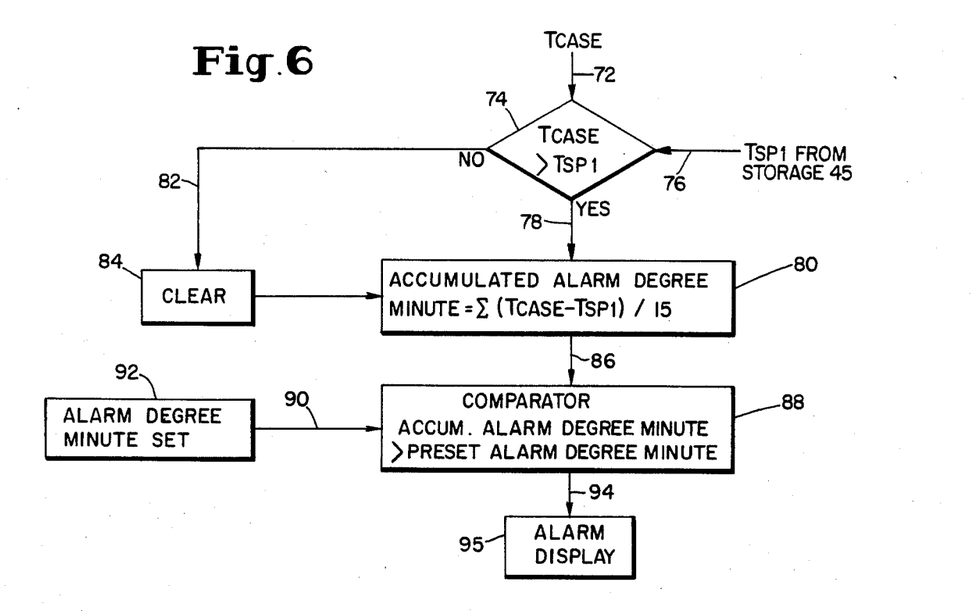
FIG. 6 is a representational block diagram for the operation of the alarm feature of the invention.

Referring to FIG. 6 there is shown a diagram of the integrated time-temperature alarm of the control system of the invention. The case temperature signal $T_{case}$ from sensor 20 is fed via line 72 to a comparator 74 which also receives via line 76 the Set Temperature+1 ($T_{sp1}$) from storage 46. The comparator 74 compares the two signals and if $T_{case}$ is greater than $T_{sp1}$ the comparator feeds a YES difference signal via line 78 to an accumulator-counter totalizer 80. The accumulator-totalizer 80 is adapted to receive the signal on line 78 once per cycle or once per 4 seconds in the illustrative example. This temperature difference signal is placed on a per minute basis by the circuitry of the accumulator-counter totalizer 80 by dividing the difference signal on line 78 by 15. In the illustrative example the control system operates on a nominal 4 second cycle basis which produces 15 pulses per minute. Accordingly the one minute total of 15 temperature difference signals on line 78 each divided by 15 and then totalized provides a degree minute signal for each minute that the accumulator-counter totalizer receives a sequence of 15 signal pulses from the comparator 74.

If comparator 74 determines for a particular $T_{case}$ signal on line 72 that $T_{case}$ is not greater than $T_{sp1}$ a NO signal is fed via line 82 to a totalizer clear circuit 84 which clears the existing total in accumulator-counter totalizer 80. In the absence of such a signal from the clear circuit 84 the accumulator-counter totalizer 80 continues to totalize the sum of the temperature differences ($T_{case}-T_{sp1}$)/15 which constitutes a cumulative summation of degree minutes that the temperature of the case has exceeded $T_{sp1}$. It should be noted that because of the operation of the clear circuit 84 this total continues to accumulate only so long as the case temperature $T_{case}$ continuously exceeds $T_{sp1}$. If the case temperature does not exceed $T_{sp1}$ for a single pulse the totalizer is cleared and commences a new summation.

The degree minute total from accumulator-counter totalizer 80 is fed via line 86 to a comparator 88. The comparator 88 also receives a set signal input via line 90 from the alarm degree minute set device 92. The purpose of the accumulated alarm degree minute mechanism illustrated in FIG. 6 is to provide an alarm display or signal which is actuated when the temperature of the controlled refrigerated display case has continously exceeded $T_{sp1}$ for a period of time which experience has indicated is abnormal and which warrants investigation and/or corrective action.

Experience has shown that the time period over which this total is most effectively accumulated is preferably approximately twice the time duration of a normal defrost of defrost cycle pull down or, in general, a time period of from one to three hours or preferably approximately two hours in an illustrative case. The total temperature difference to be tolerated over this time span before actuating the alarm display or signal is an empirically determined value. The total alarm degree minute set value stored in the set device 92 will vary with the nature of the refrigerated display case being controlled. Thus, different alarm degree minute set values will be utilized for frozen food cases, meat cases, dairy cases and produce cases by way of example. Illustrative values of the alarm degree minute set values for such different types of cases may be approximately 4000 for frozen food cases, 1500 for meat cases, 1000 for dairy case and 500 for produce cases.

The comparator 88 compares the totalized degree minutes from accumulator-counter totalizer 80 with the alarm degree minute set value received on line 90. If this total received from the totalizer 80 equals or exceeds the alarm degree minute set value received on line 90 an actuating signal is then fed via line 94 to the alarm display or signal device 95. The device 95 may display an alarm at the controlled case, at the controller mechanism and/or at any central and/or other location desired. Upon actuation of the alarm an investigation and appropriate corrective action may be undertaken if such investigation indicates that corrective action is indicated or desired. During a defrost cycle as controlled by the defrost clock 28 the $T_{case}$ signal on line 72 is interrupted and by-passes the alarm circuitry.

It will be seen that the accumulated alarm degree minute system of the invention provides an alarm and control feature in addition to those previously described herein and provides an integrated surveillance of the refrigeration system over a relative long time span. This provides the advantageous feature of detecting and reporting small deviations in the desired case temperature which exist continuously over long time spans and which ordinarily are controlled by the previously described control system but which might indicate that investigation and/or corrective action may be in order to account for the prolonged upward deviation in case temperature.

Figure 7:
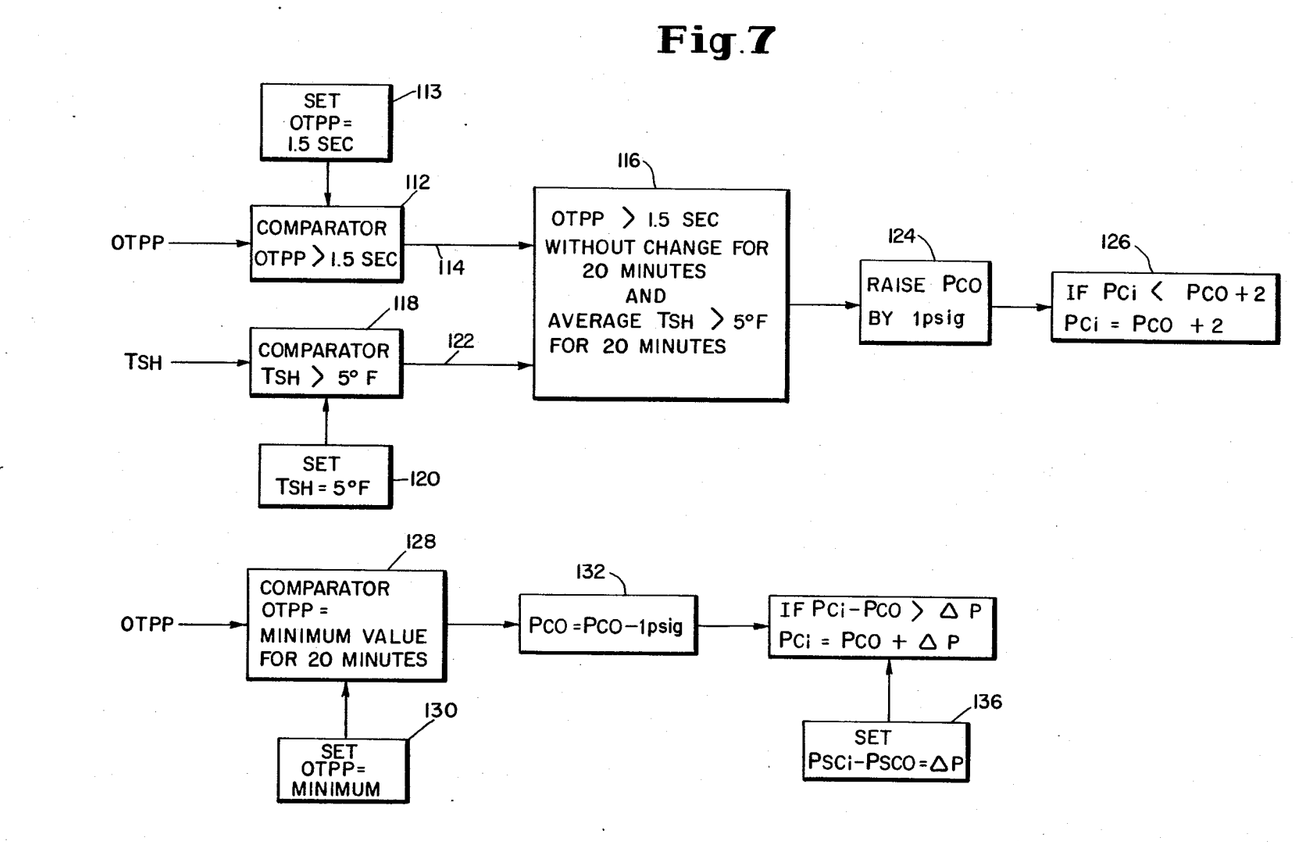
FIG. 7 is a representational block diagram for the operation of the compressor cut-in and cut-out control device of the invention.

The control system of this invention described heretofore has utilized temperature sensors and temperature control to effectuate the desired operating conditions of the refrigerated display unit. It is also a feature of the invention to achieve optimization of the control of the refrigerated case through sensing and adjustment of the compressor suction pressure. Referring to FIG. 7 there is a shown a representational block diagram of this embodiment of the invention.

The suction pressure of the compressor illustrated in FIG. 1 may be sensed by a suitable pressure sensor indicated at 25 in the suction line 12. The compressor is provided with the usual suction pressure cut-out and suction cut-in limits for controlling the actuation and deactuation of the operation of the compressor. The various pertinent pressures which are involved herein are referred to as follows: $P_{sci}$=set compressor suction cut-in pressure; $P_{sco}$=set compressor suction cut-out pressure and $P_s$=sensed compressor suction pressure at 25 in FIG. 1. In addition to the foregoing set cut-in and cut-out pressures the actual operating compressor cut-in and cut-out suction pressures are indicated as follows: $P_{ci}$=actual compressor cut-in suction pressure; and $P_{co}$=actual compressor cut-out suction pressure. Also as used hereinbefore, the difference between the temperature of the refrigerant exiting the evaporator coil and the temperature of the refrigerant entering the evaporator coil is referred to as the superheat temperature or DELTA $T_{sh}$ or simply $T_{sh}$. The off time per cycle of the valve actuating signal is referred to as OTPP. Referring to FIG. 7 a comparator 112 receives a sample of the valve actuating signal which includes the OTPP information. Comparator 112 also receives from set device 113 a set comparison signal of off time equals 1.5 seconds. When actual operating off time OTPP is greater than the set 1.5 seconds per pulse a signal is fed via line 114 to microprocessor circuitry 116. The microprocessor circuitry 116 also receives an input from a second comparator 118. Comparator 118 receives a sample of the superheat temperature $T_{sh}$ as well as a 5° F. superheat set signal from set device 120. When the actual superheat temperature $T_{sh}$ is greater than the set 5° F. superheat a signal is forwarded via line 122 to the microprocessor circuitry 116.

The microprocessor circuitry 116 performs the following AND function: When OTPP is greater than 1.5 seconds without change for a period of 20 minutes AND the average $T_{sh}$ has been greater than 5° F. for said 20 minutes a signal is fed to controller 124 to raise the suction pressure cut-out value by 1 psig. An indication of such an increase in $P_{co}$ is fed to controller 126 which insures that the differential between the cut-in and cut-out suction pressures does not drop below a preselected minimum value such as 2 psig. Thus if $P_{ci}$ is less than $P_{co}=2$ the controller 126 sets $P_{ci}$ equal to $P_{co}+2$ in order to maintain that minimum.

Considering the operation of the portion of the pressure control optimizer just described, the OTPP trigger time of 1.5 seconds per pulse is relatively high, i.e. a relatively low rate of refrigerant flow through the expansion valve. If this condition persists unchanged for 20 minutes as is programmed into the unit, it indicates that the valve setting has not been modified by the integrating control feature described in conjunction with FIG. 3 during that 20 minutes. Raising the suction cut-out pressure $P_{co}$ by 1 psig tends to decrease the running time of the compressor with a concomitant energy saving.

While the foregoing describes the situation when the off time per pulse OTPP is relatively high and the flow through the expansion valve is relatively low, the lower section of the pressure control optimization embodiment of the invention in FIG. 7 optimizes the converse situation wherein the expansion valve flow is relatively high and the off time per pulse OTPP is low or at its minimum setting. A comparator 128 (which could be combined with comparator 112) receives a sample of the OTPP signal as well as a set signal from set device 130. This set signal provides the value of the OTPP minimum setting or 0.12 seconds by way of illustrative example.

When the comparator 128 determines that OTPP is equal to its minimum setting a signal is fed to operator 132 which lowers the compressor cut-off suction pressure $P_{co}$ by 1 psig. The new $P_{co}$ value is fed to comparator 134 which also receives an input from set device 136. The set device 136 provides the difference between the set values of the suction line cut-in pressure and the suction cut-out pressure which is indicated as DELTA P. The comparator 134 compares the difference between the actual $P_{ci}-P_{co}$ with DELTA P and if this difference is greater than DELTA P, $P_{ci}$ is adjusted to reestablish DELTA P. This prevents $P_{ci}-P_{co}$ from beccomming greater than the set DELTA P as $P_{co}$ is lowered in response to the drop in the OTPP to its minimum value and the concomitant large rate of refrigerant flow through the expansion valve.

It will be seen that the difference between the cut-in and cut-out pressures $P_{ci}$ and $P_{co}$ has a nominal set value of DELTA P, a minimum value of 2 when OTPP is relatively high and a maximum value equal to the nominal DELTA P when OTPP is low or at its minimum flow. It will be understood that the compressor suction pressures will vary with the operating temperatures of the particular refrigerated display cases involved as well as with the identity and nature of the refrigerant. By way of example, for a frozen food display case the set cut-out and cut-in suction pressures may be 10 and 15 psig thereby establishing a nominal DELTA P of 5 psig. The pressure control optimization device illustrated in FIG. 7 provides a further refinement on the control exercised by the control unit of the present invention and tends to produce additional savings in energy.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

We claim:

1. A refrigeration system comprising:

A refrigerated display case with a primary air conduit having air inlet and outlet openings and an evaporator coil arranged therein for refrigerating air passing therethrough;

An expansion valve coupled to said evaporator coil for providing refrigerant thereto;

Electronic means for controlling the rate of refrigerant flow through said expansion valve;

A refrigeration control system including:

Temperature sensing means for sensing the temperature ($T_{case}$) of air that has passed over said evaporator coil; means for storing sensed time related temperature parameters; means for setting preselected temperature control parameters including temperature differential limits and time related temperature parameters; means for comparing temperature $T_{case}$ with said limits; electronic signals indicative of the flow rate of said valve; means for comparing the sensed temperature and the stored time related temperature parameters with said set limits and set time related temperature parameters; and means for controlling the flow rate of said valve as a function of the differentials of $T_{case}$ and said stored time related temperature parameters and set time related temperature parameters and the flow rate of said valve as indicated by said electronic signal.

2. A refrigeration system according to claim 1 wherein the flow rate of said valve is controlled by changing the flow rate as an incremental change from the setting for the existing flow rate as indicated by said electronic signal.

3. A refrigeration system according to claim 1 wherein the flow rate through said valve is determined by cyclically moving said valve between maximum and minimum open conditions and controlling the times during a cycle that the valve is in said maximum and minimum conditions.

4. A refrigeration system according to claim 3 wherein said valve is actuated by cyclic signals having per cycle on and off times controlling the per cycle times that said valve is in said maximum and minimum flow conditions.

5. A refrigeration system according to claim 4 wherein said electronic signal indicative of the flow rate of said valve comprises a sample of said cyclic signals.

6. A refrigeration system according to claim 1 wherein said temperature differential limits for $T_{case}$ include a first set of limits, counter means for storing a count of the number of times said first set of limits has been exceeded by $T_{case}$ within a present time period, means for setting a predetermined total of excursions of $T_{case}$ beyond said limits for said preset time period, and comparator means for determining when said preset total has been exceeded and modifying the flow rate through said valve in response thereto.

7. A refrigeration system according to claim 1 including temperature sensing means for sensing the rise in temperature of the refrigerant in its passage through the evaporator coil and the upward or downward trend in said rise, and means responsive to the direction of said trend for initiating valve action to avoid flood out of said evaporator coil.

8. A refrigeration system according to claim 1 including temperature sensing means for sensing the rise in temperature of the refrigerant in its passage through the evaporator coil ($T_{sh}$), means for detecting an upward or downward trend of $T_{sh}$ over a predetermined time period, means for setting a predetermined $T_{sh}$, means for setting predetermied limits of departure of $T_{sh}$ from said set $T_{sh}$, comparator means for comparing the sensed $T_{sh}$ and the set $T_{sh}$, and means for changing the flow rate through said valve when said comparator determines that the said departure limits of $T_{sh}$ have been exceeded.

9. A refrigeration system according to claim 8 wherein a different limit of departure is set for an upward trend of $T_{sh}$ than for a downward trend of $T_{sh}$.

10. A refrigeration system according to claim 6 wherein said temperature differential limits for $T_{case}$ include a second set of limits greater than said first set and said comparator means includes means for comparing $T_{case}$ and said second set of limits, and means for controlling the flow rate of said valve to open said valve to its maximum flow rate when one of said second set of limits is exceeded and to close said valve to its minimum flow rate when the other of said second set of limits is exceeded.

11. A refrigeration system according to claim 1 wherein said means for comparing temperature $T_{case}$ with said limits includes means for comparing temperature $T_{case}$ with at least one temperature differential limit and providing a time related control signal when $T_{case}$ exceeds said limit, said control signal being indicative of the magnitude and time duration of the deviation between $T_{case}$ and said limit; totalizer means for integrating said deviation over a time period; means for setting a preselected time/temperature integrated value of deviation of $T_{case}$ from said limit; alarm means; and means for actuating said alarm means when the integrated value of deviation in said totalizer means exceeds said preselected time/temperature integrated value.

12. A refrigeration system comprising:
   A refrigerated display case with a primary air conduit having air inlet and outlet openings and an evaporator coil arranged therein for refrigerating air passing therethrough;
   An expansion valve coupled to said evaporator coil for providing refrigerant thereto;
   Electronic means for controlling the rate of refrigerant flow through said expansion valve;
   A refrigeration control system including:
   Temperature sensing means for sensing the temperature ($T_{case}$) of air that has passed over said evaporator coil; means for setting multiple preselected temperature control parameters including a set temperature for $T_{case}$ and positive and negative temperature differential limits therefrom; means for comparing temperature $T_{case}$ with said limits; electronic control signals indicative of the flow rate of said valve; and means for controlling the flow rate of said valve as a first function of the differentials of $T_{case}$ and one set of said limits and as a second function of the differentials of $T_{case}$ and a second set of limits wherein said second function is dependent upon the flow rate of said valve as indicated by said electronic signal.

13. A refrigeration system according to claim 12 wherein the flow rate of said valve is controlled by changing the flow rate setting in response to said first function by changing said flow rate setting from its existing setting to a predetermined maximum or minimum setting and by changing the flow rate setting in response to said second function in proportion to the flow rate setting as indicated by said electronic signal.

14. A refrigeration system according to claim 13 including a counter means for storing a count of the number of times a set of said temperature differential limits has been exceeded by $T_{case}$ within a preset time period, means for setting a predetermined total of excursions of $T_{case}$ beyond said limits for said preset time period, comparator means for determining when said preset total has been exceeded, and control means for modifying the flow rate through said valve in response thereto.

15. A refrigeration system according to claim 14 wherein the flow rate through said valve is determined by cyclically moving said valve between maximum and minimum open conditions and controlling the times during a cycle that the valve is in said maximum and minimum conditions.

16. A refrigeration system according to claim 15 wherein said valve is actuated by cyclic signals having per cycle on and off times controlling the per cycle times that said valve is in said maximum and minimum open conditions.

17. A refrigeration system according to claim 16 wherein said electronic signals indicative of the flow rate of said valve comprises a sample of said cyclic signals.

18. A refrigeration system according to claim 15 including temperature sensing means for sensing the rise in temperature of the refrigerant in its passage through the evaporator coil and the upward or downward trend in said rise, and means responsive to the direction of said trend for initiating valve action to avoid flood out of said evaporator coil.

19. A refrigeration system according to claim 12 wherein said means for comparing temperature $T_{case}$ with said limits includes means for comparing temperature $T_{case}$ with at least one of said limits and providing a time related control signal when $T_{case}$ exceeds said limit, said control signal being indicative of the magnitude and time duration of the deviation between $T_{case}$ and said limit; totalizer means for integrating said deviation over a time period; means for setting a preselected time/temperature integrated value of deviation of $T_{case}$ from said limit; alarm means; and means for actuating said alarm means when the integrated value of deviation in said totalizer means exceeds said preselected time/temperature integrated value.

20. A refrigeration system according to claim 12 including means for increasing said set temperature for $T_{case}$ by a preselected amount during preselected hours.

21. A refrigeration system according to claim 12 including:
   Compressor means for compressing gaseous refrigerant received by said compressor from said evaporator coil at a compressor suction pressure; means for actuating said compressor means at a preselected cut-in suction pressure $P_{ci}$; means for deactuating said compressor means at a preselected cut-out suction pressure $P_{co}$; means providing an electronic signal representative of said rate of refrigerant flow through said expansion valve; comparator means for determining when said rate of refrigerant flow has been less than a preselected value for a preselected period of time and producing a signal indicative of said condition; and means responsive to said signal for raising the cut-out suction pressure $P_{co}$ by a preselected amount in response thereto.

22. A refrigeration system according to claim 21 including means for limiting the difference between $P_{co}$ and $P_{ci}$ to a preselected minimum.

23. A refrigeration system according to claim 21 including:
   Comparator means for determining when said rate of refrigerant flow has been substantially at a preselected maximum for a preselected period of time and producing a signal indicative of said condition; and means responsive to said last named signal for lowering the cut-out suction pressure $P_{co}$ by a preselected amount in response thereto.

24. A refrigeration system according to claim 23 including means for limiting the difference between $P_{co}$ and $P_{ci}$ to a preselected maximum.

25. A refrigeration system comprising:
   A refrigerated display case with a primary air conduit having air inlet and outlet openings and an evaporator coil arranged therein for refrigerating air passing therethrough;
   Electronic means for controlling the rate of refrigerant flow through said expansion valve;
   A refrigeration control system including:

Temperature sensing means for sensing the temperature ($T_{case}$) of air that has passed over said evaporator coil;

Means for setting a preselected level of $T_{case}$ ($T_{set}$) and multiple plus or minus limits of $T_{case}$ deviation therefrom, $T_{set}+K_1$, $T_{set}+K_2$, $T_{set}-K_1$, $T_{set}-K_2$;

Comparator means for comparing temperature $T_{case}$ with said limits of deviation and producing an output comparison signal; and Control means receiving the output comparison signal and providing an output control signal for controlling operation of the valve so that the flow rate of refrigerant through the valve is adjusted in accordance with the following:

If $T_{case} > T_{set} + K_2$ the valve flow rate is increased by a predetermined amount;

If $T_{case} < T_{set} + K_2$ but $> T_{set}$ the valve flow rate is increased by an amount which is a function of its preadjustment setting;

If $T_{case} < T_{set} - K_2$ the valve flow rate is decreased by a predetermined amount;

If $T_{case} > T_{set} - K_2$ but $< T_{set}$ the flow rate is decreased by an amount which is a function of its preadjustment setting;

Said control means further responding to the value of $T_{case}$ relative to $T_{set} \pm K_1$ over time in controlling the valve.

26. A refrigeration system according to claim 25 wherein the flow rate of refrigerant through the valve is adjusted in accordance with the following:

If $T_{case} > T_{set} + K_2$ the valve flow rate is increased to a preset maximum amount; and If $T_{case} < T_{set} - K_2$ the valve flow rate is decreased to a preset minimum amount.

27. A refrigeration system according to claim 25 including:

First counter means counting the number of times that $T_{case}$ passed or underwent an excursion beyond $T_{set}+K_1$ within a predetermined time period;

Second counter means for counting the number of times that $T_{case}$ passed or underwent an excursion beyond $T_{set}-K_1$ within a predetermined time period;

Means for setting a predetermined $T_{case}$ excursion total for said predetermined time period;

Comparator means for comparing the counts within said counter means and said set excursion total; and Control means receiving the comparison signal and providing an output control signal for controlling operation of the valve so that the flow rate is adjusted to increase the same when the count in the first counter means exceeds the present total within the time period and to decrease the flow rate when the count in the second counter means exceeds the preset total within the time period.

28. A refrigeration system according to claim 25 including:

Temperature sensing means for sensing the rise in temperature of the refrigerant in its passage through the evaporator coil (DELTA $T_{sh}$);

Means for scanning DELTA $T_{sh}$ at cyclic intervals;

Storage means for storing scanned values of DELTA $T_{sh}$ in a cycle sequence DELTA $T_{sh1}$, DELTA $T_{sh2}$, DELTA $T_{sh3}$, DELTA $T_{shx}$;

Comparator means for comparing a recent value of DELTA $T_{shx}$ with an earlier value of DELTA $T_{sh1}$ to determine an upward or downward trend in DELTA $T_{sh}$ during the comparison time period;

Means for setting a trigger temperature differential for an upward trend in DELTA $T_{sh}$ (upward DELTA $T_{set}$) and for setting a different trigger temperature differential for a downward trend in DELTA $T_{sh}$ (downward DELTA $T_{set}$);

Comparator means for comparing DELTA $T_{sh}$ selectively with upward DELTA $T_{set}$ during an upward trend and with downward DELTA $T_{set}$ during a downward trend; and Control means for receiving the output comparison signal and providing an output control signal for controlling operation of the valve so that the flow rate of refrigerant through the valve is adjusted downwardly when the comparison signal is less than the trigger differential in effect.

29. A refrigeration system according to claim 27 including:

Temperature sensing means for sensing the rise in temperature of the refrigerant in its passage through the evaporator coil (DELTA $T_{sh}$);

Means for scanning DELTA $T_{sh}$ at cyclic intervals;

Storage means for storing scanned values of DELTA $T_{sh}$ in a cycle sequence DELTA $T_{sh1}$, DELTA $T_{sh2}$, DELTA $T_{sh3}$, DELTA $T_{shx}$;

Comparator means for comparing a recent value of DELTA $T_{shx}$ with an earlier value of DELTA $T_{sh1}$ to determine an upward or downward trend in DELTA $T_{sh}$ during the comparison time period;

Means for setting a trigger temperature differential for an upward trend in DELTA $T_{sh}$ (upward DELTA $T_{set}$) and for setting a different trigger temperature differential for a downward trend in DELTA $T_{sh}$ (downward DELTA $T_{set}$);

Comparator means for comparing DELTA $T_{sh}$ selectively with upward DELTA $T_{set}$ during an upward trend and with downward DELTA $T_{set}$ during a downward trend; and Control means for receiving the output comparison signal and providing an output control signal for controlling operation of the valve so that the flow rate of refrigerant through the valve is adjusted downwardly when the comparison signal is less than the appropriate trigger differential in effect.

30. A refrigeration system according to claim 25 wherein said valve is movable between maximum and minimum flow conditions and is actuated by cyclic signals having per cycle on and off times controlling per cycle times that said valve is in said maximum and minimum flow conditions.

31. A refrigeration system according to claim 30 including temperature sensing means for sensing the rise in temperature of the refrigerant in its passage through the evaporator coil and the upward or downward trend in said rise, and means responsive to the direction of said trend for initiating valve action to avoid flood out of said evaporator coil.

32. A refrigeration system according to claim 27 wherein said valve is movable between maximum and minimum flow conditions and is actuated by cyclic signals having per cycle on and off times controlling the per cycle times that said valve is in said maximum and minimum flow conditions.

33. A refrigeration system according to claim 32 including temperature sensing means for sensing the rise in temperature of the refrigerant in its passage through the evaporator coil and the upward or downward trend in said rise, and means responsive to the direction of said trend for initiating valve action to avoid flood out of said evaporator coil.

34. A refrigeration system according to claim 28 wherein said valve is movable between maximum and minimum flow conditions and is actuated by cyclic signals having per cycle on and off times controlling the per cycle times that said valve is in said maximum and minimum flow conditions.

35. A refrigeration system according to claim 34 including temperature sensing means for sensing the rise in temperature of the refrigerant in its passage through the evaporator coil and the upward or downward trend in said rise, and means responsive to the direction of said trend for initiating valve action to avoid flood out of said evaporator coil.

36. A refrigeration system according to claim 17 wherein said comparator means for comparing temperature $T_{case}$ with said limits of deviation includes means for comparing temperature $T_{case}$ with at least one of said limits and providing a time related control signal when $T_{case}$ exceeds said limit, said control signal being indicative of the magnitude and time duration of the deviation between $T_{case}$ and said limit; totalizer means for integrating said deviation over a time period; means for setting a preselected time/temperature integrated value of deviation of $T_{case}$ from said limit; alarm means; and means for actuating said alarm means when the integrated value of deviation in said totalizer means exceeds said preselected time/temperature integrated value.

37. A refrigeration system according to claim 25 including means for increasing $T_{set}$ by a preselected amount during preselected hours.

38. A refrigeration system according to claim 25 including:
Compressor means for compressing gaseous refrigerant received by said compressor from said evaporator coil at a compressor suction pressure; means for actuating said compressor means at a preselected cut-in suction pressure $P_{ci}$; means for deactuating said compressor means at a preselected cut-out suction pressure $P_{co}$; means providing an electronic signal representative of said rate of refrigerant flow through said expansion valve; comparator means for determining when said rate of refrigerant flow has been less than a preselected value for a preselected period of time and producing a signal indicative of said condition; and means responsive to said signal for raising the cut-out suction pressure $P_{co}$ by a preselected amount in response thereto.

39. A refrigeration system according to claim 38 including means for limiting the differences between $P_{co}$ and $P_{ci}$ to a preselected minimum.

40. A refrigeration system according to claim 38 including:
Comparator means for determining when said rate of refrigerant flow has been substantially at a preselected maximum for a preselected period of time and producing a signal indicative of said condition; and means responsive to said last named signal for lowering the cut-out suction pressure $P_{co}$ by a preselected amount in response thereto.

41. A refrigeration system according to claim 40 including means for limiting the difference between $P_{co}$ and $P_{ci}$ to a preselected maximum.

42. A refrigeration system comprising:
A refrigerated display case with a primary air conduit having air inlet and outlet openings and an evaporator coil arranged therein for refrigerating air passing therethrough;
An expansion valve coupled to said evaporator coil for providing refrigerant thereto;
Electronic means for controlling the rate of refrigerant flow through said expansion valve;
A refrigeration control system including:
Temperature sensing means for sensing the rise in temperature of the refrigerant in its passage through the evaporator coil (DELTA $T_{sh}$);
Means for scanning DELTA $T_{sh}$ at cyclic intervals;
Storage means for storing scanned values of DELTA $T_{sh}$ in a cycle sequence DELTA $T_{sh1}$, DELTA $T_{sh2}$, DELTA $T_{sh3}$, DELTA $T_{shx}$;
Comparator means for comparing a recent value of DELTA $T_{shx}$ with an earlier value of DELTA $T_{sh1}$ to determine an upward or downward trend in DELTA $T_{sh}$ during the comparison time period;
Means for setting a trigger temperature differential for an upward trend in DELTA $T_{sh}$ (upward DELTA $T_{set}$) and for setting a different trigger temperature differential for a downward trend in DELTA $T_{sh}$ (downward DELTA $T_{set}$);
Comparator means for comparing DELTA $T_{sh}$ selectively with upward DELTA $T_{set}$ during an upward trend and with downward DELTA $T_{set}$ during a downward trend; and
Control means for receiving the output comparison signal and providing an output control signal for controlling operation of the valve so that the flow rate of refrigerant through the valve is adjusted downwardly when the comparison signal is less than the appropriate trigger differential in effect.

43. A refrigeration system according to claim 42 including temperature sensing means for sensing the temperature ($T_{case}$) of air that has passed over said evaporator coil; means for setting a set temperature for $T_{case}$ and at least one temperature differential limit therefrom; means for comparing temperature $T_{case}$ with said limit and providing a time related control signal when $T_{case}$ exceeds said limit, said control signal being indicative of the magnitude and time duration of the deviation between $T_{case}$ and said limit; totalizer means for integrating said deviation over a time period; means for setting a preselected time/temperature integrated value of deviation of $T_{case}$ from said limit; alarm means; and means for actuating said alarm means when the integrated value of deviation in said totalizer means exceeds said preselected time/temperature integrated value.

44. A refrigeration system according to claim 42 including:
Compressor means for compressing gaseous refrigerant received by said compressor from said evaporator coil at a compressor suction pressure; means for actuating said compressor means at a preselected cut-in suction pressure $P_{ci}$; means for deactuating said compressor means at a preselected cut-out suction pressure $P_{co}$; means providing an electronic signal representative of said rate of refrigerant flow through said expansion valve; comparator means for determining when said rate of refrigerant flow has been less than a preselected value for a preselected period of time and producing a signal indicative of said condition; and means responsive to said signal for raising the cut-put suction pressure $P_{co}$ by a preselected amount in response thereto.

45. A refrigeration system according to claim 42 including:

Compressor means for compressing gaseous refrigerant received by said compressor from said evaporator coil at a compressor suction pressure; means for actuating said compressor means at a preselected cut-in suction pressure $P_{ci}$; means for deactuating said compressor means at a preselected cut-out suction pressure $P_{co}$; means providing an electronic signal representative of said rate of refrigerant flow through said expansion valve; comparator means for determining when said rate of refrigerant flow has exceeded a preselected value for a preselected period of time AND when said DELTA $T_{sh}$ has exceeded a preselected value for a preselected period of time; and means responsive to the existence of said conditions determined by said comparator for raising the cut-out suction pressure $P_{co}$ by a preselected amount in response thereto.

46. A refrigeration system according to claim 45 including means for limiting the diffrence between $P_{co}$ and $P_{ci}$ to a preselected minimum.

47. A refrigeration system according to claim 45 including comparator means for determining when said rate of refrigerant flow has been substantially at a preselected maximum for a preselected period of time and means responsive to said last named condition for lowering the cut-out suction pressure $P_{co}$ by a preselected amount in response thereto.

48. A refrigeration system according to claim 47 including means for limiting the difference between $P_{co}$ and $P_{ci}$ to a preselected maximum.

49. A refrigeration system comprising:
A refrigerated display case with a primary air conduit having air inlet and outlet openings and an evaporator coil arranged therein for refrigerating air passing therethrough;
An expansion valve coupled to said evaporator coil for providing refrigerant thereto;
Electronic means for controlling the rate of refrigerant flow through said expansion valve;
A refrigeration control system including:
Temperature sensing means for sensing the temperature ($T_{case}$) of air that has passed over said evaporator coil; means for setting preselected temperature control parameters including a set temperature for $T_{case}$ and at least one temperature differential limit therefrom; means for comparing temperature $T_{case}$ with said limit and providing a time related control signal when $T_{case}$ exceeds said limit, said control signal being indicative of the magnitude and time duration of the deviation between $T_{case}$ and said limit; totalizer means for integrating said deviation over a time period; means for setting a preselected time/temperature integrated value of deviation of $T_{case}$ from said limit; alarm means; and means for actuating said alarm means when the integrated value of deivation in said totalizer means exceeds said preselected time/temperature integrated value.

50. A refrigeration system according to claim 49 wherein said time related control signal is periodic, and including means for clearing the contents of said totalizer means at the end of any said time period wherein $T_{case}$ does not exceed said limit.

51. A refrigeration system according to claim 49 wherein said totalizer is bypassed during the defrost cycles.

52. A refrigeration system according to claim 51 wherein said time/temperature integrated value is at least up to twice as long as the time/temperature duration of a normal defrost cycle pulldown for said refrigerated display case.

53. A refrigeration system comprising:
A refrigerated display case with a primary air conduit having air inlet and outlet openings and an evaporator coil arranged therein for refrigerating air passing therethrough;
An expansion valve coupled to said evaporator coil for providing refrigerant thereto;
Compressor means for compressing gaseous refrigerant received by said compressor from said evaporator coil at a compressor suction pressure;
Means for actuating said compressor means at a preselected cut-in suction pressure $P_{ci}$;
Means for deactuating said compressor means at a preselected cut-out suction pressure $P_{co}$;
Electronic means for controlling the rate of refrigerant flow through said expansion valve;
A refrigeration control system including:
Means providing an electronic signal representative of said rate of refrigerant flow through said expansion valve; comparator means for determining when said rate of refrigerant flow has been less than a preselected value for a preselected period of time and producing a signal indicative of said condition; and means responsive to said signal for raising the cut-out suction pressure $P_{co}$ by a preselected amount in response thereto.

54. A refrigeration system according to claim 53 including means for limiting the difference between $P_{co}$ and $P_{ci}$ to a preselected minimum.

55. A refrigeration system according to claim 53 including comparator means for determining when said rate of refrigerant flow has been substantially at a preselected maximum for a preselected period of time and producing a signal indicative of said condition; and means responsive to said last named signal for lowering the cut-out suction pressure $P_{co}$ by a preselected amount in response thereto.

56. A refrigeration system according to claim 55 including means for limiting the difference between $P_{co}$ and $P_{ci}$ to a preselected maximum.

57. A refrigeration system comprising:
A refrigerated display case with a primary air conduit having air inlet and outlet openings and an evaporator coil arranged therein for refrigerating air passing therethrough;
An expansion valve coupled to said evaporator coil for providing refrigerant thereto;
Compressor means for compressing gaseous refrigerant received by said compressor from said evaporator coil at a compressor suction pressure;
Means for actuating said compressor means at a preselected cut-in suction pressure $P_{ci}$;
Means for deactuating said compressor means at a preselected cut-out suction pressure $P_{co}$;
Electronic means for controlling the rate of refrigerant flow through said expansion valve;
A refrigeration control system including:
Temperature sensing means for sensing the rise in temperature of the refrigerant in its passage through the evaporator coil ($T_{sh}$); means providing an electronic signal representative of said rate of refrigerant flow through said expansion valve; comparator means for determining when said rate of refrigerant flow has exceeded a preselected value for a preselected period of time AND when said $T_{sh}$ has exceeded a preselected value for a preselected period of time; and means responsive to said conditions determined by said comparator means for raising the cut-out suction pressure $P_{co}$ by a preselected amount in response thereto.

58. A refrigeration system according to claim 57 including means for limiting the difference between $P_{co}$ and $P_{ci}$ to a preselected minimum.

59. A refrigeration system according to claim 57 including comparator means for determining when said rate of refrigerant flow has been substantially at a preselected maximum for a preselected period of time; and means responsive to said last named condition for lowering the cut-out suction pressure $P_{co}$ by a preselected amount in response thereto.

60. A refrigeration system according to claim 59 including means for limiting the difference between $P_{co}$ and $P_{ci}$ to a preselected maximum.

* * * * *

UNITED STATES PATENT AND TRADEMARK OFFICE
CERTIFICATE OF CORRECTION

PATENT NO. : 4,621,502

DATED : November 11, 1986

INVENTOR(S) : Fayez F. Ibrahim and Kwok K. Fung

It is certified that error appears in the above-identified patent and that said Letters Patent are hereby corrected as shown below:

Column 1, line 61, "overlaod" should read --overload--.

Column 13, line 15, "defrost of defrost cycle" should read --defrost or defrost cycle--.

Column 14, line 44, "$P_{co} = 2$" should read --$P_{co} + 2$--.

Column 19, line 53, "present" should be --preset--.

Column 21, line 16, "17" should read --25--.

Column 22, line 51, "differences" should read --difference--.

Column 23, line 56, "deivation" should read --deviation--.

Signed and Sealed this

Tenth Day of February, 1987

*Attest:*

DONALD J. QUIGG

*Attesting Officer*  *Commissioner of Patents and Trademarks*